United States Patent
Tix et al.

(10) Patent No.: US 9,267,647 B2
(45) Date of Patent: Feb. 23, 2016

(54) HOT MELT LEVEL SENSOR AND SENSOR HOUSING

(71) Applicant: Graco Minnesota Inc., Minneapolis, MN (US)

(72) Inventors: Joseph E. Tix, Hastings, MN (US); Daniel P. Ross, Maplewood, MN (US); Banjamin R. Godding, St. Cloud, MN (US); Bryce J. Gapinski, Foley, MN (US); Nicholas K. Studt, Hudson, WI (US); Mark T. Weinberger, Mounds View, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 525 days.

(21) Appl. No.: 13/716,954

(22) Filed: Dec. 17, 2012

(65) Prior Publication Data
US 2014/0116535 A1    May 1, 2014

Related U.S. Application Data

(60) Provisional application No. 61/718,230, filed on Oct. 25, 2012.

(51) Int. Cl.
| F17D 3/01 | (2006.01) |
| G01F 23/00 | (2006.01) |
| G01F 23/296 | (2006.01) |
| F17D 3/00 | (2006.01) |

(52) U.S. Cl.
CPC *F17D 3/00* (2013.01); *G01F 23/00* (2013.01); *G01F 23/296* (2013.01); *G01F 23/2962* (2013.01); *Y10T 137/6416* (2015.04)

(58) Field of Classification Search
None
See application file for complete search history.

(56) References Cited

U.S. PATENT DOCUMENTS

| 3,079,596 | A | | 2/1963 | Atkinson | |
| 3,876,105 | A | * | 4/1975 | Kelling | 222/56 |
| 4,162,473 | A | * | 7/1979 | Utasi | 367/99 |
| 4,183,007 | A | * | 1/1980 | Baird | 367/119 |
| 4,437,497 | A | * | 3/1984 | Enander | 141/1 |
| 4,470,299 | A | * | 9/1984 | Soltz | 73/290 V |
| 4,545,245 | A | | 10/1985 | Sharp | |
| 4,636,997 | A | | 1/1987 | Toyama et al. | |
| 4,901,245 | A | | 2/1990 | Olson et al. | |
| 5,163,323 | A | * | 11/1992 | Davidson | 73/290 V |
| 5,438,877 | A | | 8/1995 | Vowles et al. | |
| 5,515,733 | A | * | 5/1996 | Lynnworth | G01F 1/662 73/644 |
| 5,578,994 | A | | 11/1996 | Cherek et al. | |
| 6,828,912 | B2 | | 12/2004 | Kelly | |

(Continued)

FOREIGN PATENT DOCUMENTS

| WO | WO01-79111 A1 | 10/2001 |
| WO | WO 2014172352 A1 * | 10/2014 |

OTHER PUBLICATIONS

The International Search Report and Written Opinion in counterpart PCT Application No. PCT/US2012/070099 filed Dec. 17, 2012.

*Primary Examiner* — Joseph M Pelham
(74) *Attorney, Agent, or Firm* — Kinney & Lange, P.A.

(57) ABSTRACT

An adhesive melting system comprises a melter, an ultrasonic sensor, and a feed system. The melter contains and melts adhesive. The ultrasonic sensor is positioned to sense a level of adhesive in the melter. The feed system supplies unmelted adhesive to the melter as a function of the sensed level of adhesive in the melter.

17 Claims, 3 Drawing Sheets

(56) References Cited

U.S. PATENT DOCUMENTS

| | | | | |
|---|---|---|---|---|
| 6,832,516 | B1* | 12/2004 | Dam et al. | 73/290 V |
| 7,237,578 | B2 | 7/2007 | Porter et al. | |
| 7,243,539 | B2* | 7/2007 | Otto et al. | 73/290 V |
| 7,316,552 | B2 | 1/2008 | Haynes et al. | |
| 7,390,379 | B2 | 6/2008 | Makkonen | |
| 7,626,143 | B2 | 12/2009 | Miller | |
| 8,091,579 | B2* | 1/2012 | Sintes et al. | 137/386 |
| 2004/0200858 | A1* | 10/2004 | Kappeler et al. | 222/146.5 |
| 2007/0180903 | A1 | 8/2007 | Gao | |
| 2007/0205215 | A1* | 9/2007 | Porter et al. | 222/64 |
| 2007/0261487 | A1* | 11/2007 | Sintes et al. | 73/290 V |
| 2010/0162811 | A1* | 7/2010 | Malinovskiy et al. | 73/290 V |
| 2011/0091330 | A1 | 4/2011 | DeOliviera | |
| 2013/0105517 | A1* | 5/2013 | Tix et al. | 222/146.5 |
| 2013/0112279 | A1* | 5/2013 | Ross et al. | 137/13 |
| 2014/0120254 | A1* | 5/2014 | Ross et al. | 427/207.1 |
| 2014/0332032 | A1* | 11/2014 | Lenk | 134/18 |
| 2014/0373641 | A1* | 12/2014 | Burisch et al. | 73/863 |

* cited by examiner

HOT MELT LEVEL SENSOR AND SENSOR HOUSING

CROSS-REFERENCE TO RELATED APPLICATION(S)

This application claims priority to U.S. Provisional Patent Application Ser. No. 61/718,230 entitled "Hot Melt Level Sensor and Sensor Housing," filed Oct. 25, 2012, which is hereby incorporated by reference in its entirety.

BACKGROUND

The present disclosure relates generally to systems for dispensing hot melt adhesive. More particularly, the present disclosure relates to an adhesive dispensing system with a level sensor disposed in a sensor housing.

Hot melt dispensing systems are typically used in manufacturing assembly lines to automatically disperse an adhesive used in the construction of packaging materials such as boxes, cartons and the like. Hot melt dispensing systems conventionally comprise a material tank, heating elements, a pump and a dispenser. Solid polymer pellets are melted in the tank using a heating element before being supplied to the dispenser by the pump. Because the melted pellets will re-solidify into solid form if permitted to cool, the melted pellets must be maintained at temperature from the tank to the dispenser. This typically requires placement of heating elements in the tank, the pump and the dispenser, as well as heating any tubing or hoses that connect those components. Furthermore, conventional hot melt dispensing systems typically utilize tanks having large volumes so that extended periods of dispensing can occur after the pellets contained therein are melted. However, the large volume of pellets within the tank requires a lengthy period of time to completely melt, which increases start-up times for the system. For example, a typical tank includes a plurality of heating elements lining the walls of a rectangular, gravity-fed tank such that melted pellets along the walls prevents the heating elements from efficiently melting pellets in the center of the container. The extended time required to melt the pellets in these tanks increases the likelihood of "charring" or darkening of the adhesive due to prolonged heat exposure.

SUMMARY

According to one embodiment of the present invention, an adhesive melting system comprises a melter, an ultrasonic sensor, and a feed system. The melter contains and melts adhesive. The ultrasonic sensor is positioned to sense a level of adhesive in the melter. The feed system supplies unmelted adhesive to the melter as a function of the sensed level of adhesive in the melter.

According to a second embodiment of the present invention, a level sensing system comprises a level sensor and a sensor housing. The level sensor has a sensor face, and the sensor housing has a tower and an air passage. The tower has an open end, and a sensor end that holds the level sensor a distance from the open end. The air passage provides airflow to cool and protect the level sensor.

DETAILED DESCRIPTION

Figure 1:
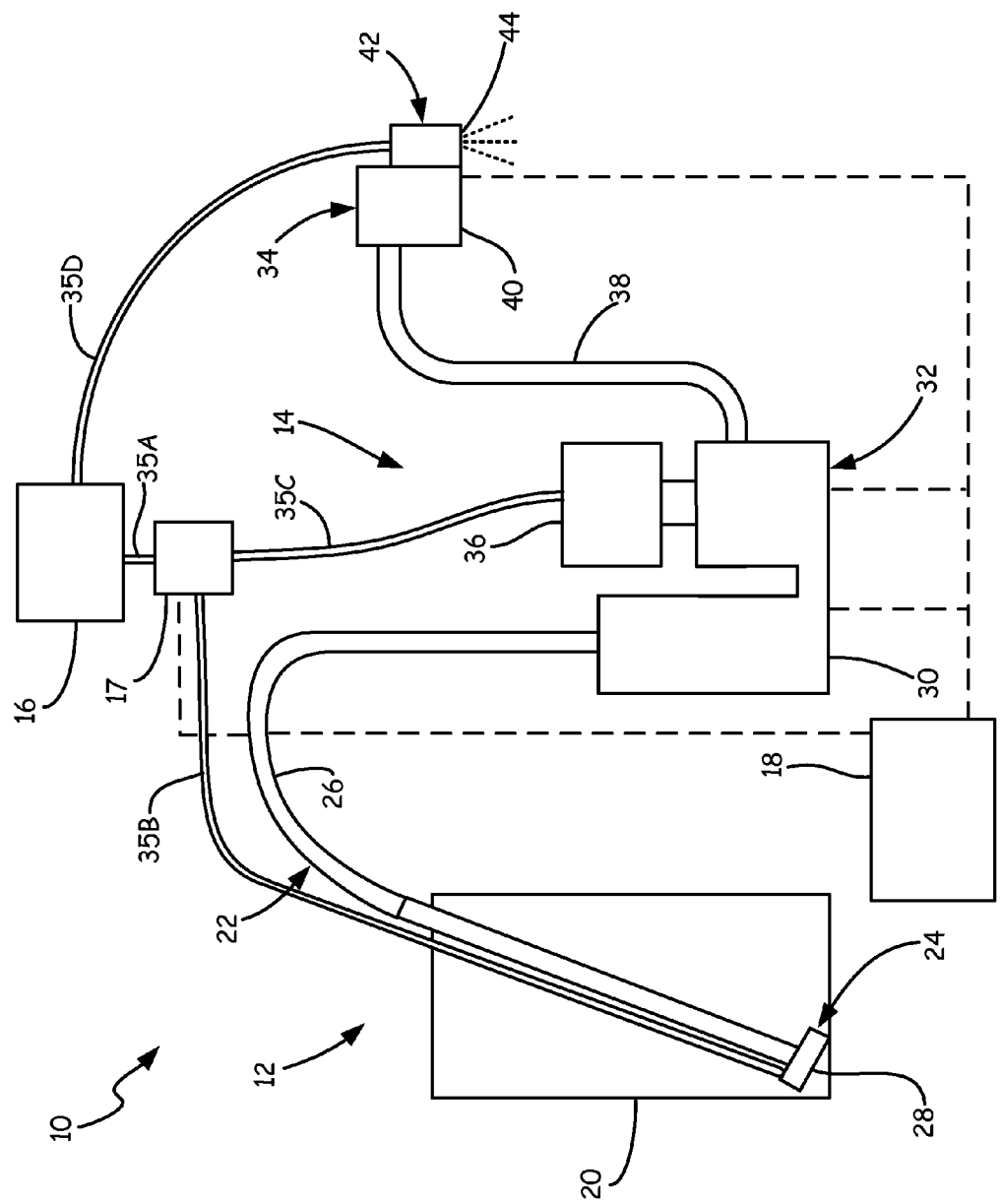
FIG. 1 is a schematic view of a system for dispensing hot melt adhesive.

FIG. 1 is a schematic view of system 10, which is a system for dispensing hot melt adhesive. System 10 includes cold section 12, hot section 14, air source 16, air control valve 17, and controller 18. In the embodiment shown in FIG. 1, cold section 12 includes container 20 and feed assembly 22, which includes vacuum assembly 24, feed hose 26, and inlet 28. In the embodiment shown in FIG. 1, hot section 14 includes melt system 30, pump 32, and dispenser 34. Air source 16 is a source of compressed air supplied to components of system 10 in both cold section 12 and hot section 14. Air control valve 17 is connected to air source 16 via air hose 35A, and selectively controls air flow from air source 16 through air hose 35B to vacuum assembly 24 and through air hose 35C to motor 36 of pump 32. Air hose 35D connects air source 16 to dispenser 34, bypassing air control valve 17. Controller 18 is connected in communication with various components of system 10, such as air control valve 17, melt system 30, pump 32, and/or dispenser 34, for controlling operation of system 10.

Components of cold section 12 can be operated at room temperature, without being heated. Container 20 can be a hopper for containing a quantity of solid adhesive pellets for use by system 10. Suitable adhesives can include, for example, a thermoplastic polymer glue such as ethylene vinyl acetate (EVA) or metallocene. Feed assembly 22 connects container 20 to hot section 14 for delivering the solid adhesive pellets from container 20 to hot section 14. Feed assembly 22 includes vacuum assembly 24 and feed hose 26. Vacuum assembly 24 is positioned in container 20. Compressed air from air source 16 and air control valve 17 is delivered to vacuum assembly 24 to create a vacuum, inducing flow of solid adhesive pellets into inlet 28 of vacuum assembly 24 and then through feed hose 26 to hot section 14. Feed hose 26 is a tube or other passage sized with a diameter substantially larger than that of the solid adhesive pellets to allow the solid adhesive pellets to flow freely through feed hose 26. Feed hose 26 connects vacuum assembly 24 to hot section 14.

Solid adhesive pellets are delivered from feed hose 26 to melt system 30. Melt system 30 can include a container (not shown) and resistive heating elements (not shown) for melting the solid adhesive pellets to form a hot melt adhesive in liquid form. Melt system 30 can be sized to have a relatively small adhesive volume, for example about 0.5 liters, and configured to melt solid adhesive pellets in a relatively short period of time. Pump 32 is driven by motor 36 to pump hot melt adhesive from melt system 30, through supply hose 38, to dispenser 34. Motor 36 can be an air motor driven by pulses of compressed air from air source 16 and air control valve 17. Pump 32 can be a linear displacement pump driven by motor 36. In the illustrated embodiment, dispenser 34 includes manifold 40 and dispensing module 42. Hot melt adhesive from pump 32 is received in manifold 40 and dispensed via module 42. Dispenser 34 can selectively discharge hot melt adhesive whereby the hot melt adhesive is sprayed out outlet 44 of module 42 onto an object, such as a package, a case, or another object benefiting from hot melt adhesive dispensed by system 10. Module 42 can be one of multiple modules that are part of dispenser 34. In an alternative embodiment, dispenser 34 can have a different configuration, such as a hand-held gun-type dispenser. Some or all of the components in hot section 14, including melt system 30, pump 32, supply hose 38, and dispenser 34, can be heated to keep the hot melt adhesive in a liquid state throughout hot section 14 during the dispensing process.

System 10 can be part of an industrial process, for example, for packaging and sealing cardboard packages and/or cases of packages. In alternative embodiments, system 10 can be modified as necessary for a particular industrial process application. For example, in one embodiment (not shown), pump 32 can be separated from melt system 30 and instead attached to dispenser 34. Supply hose 38 can then connect melt system 30 to pump 32.

Figure 2:
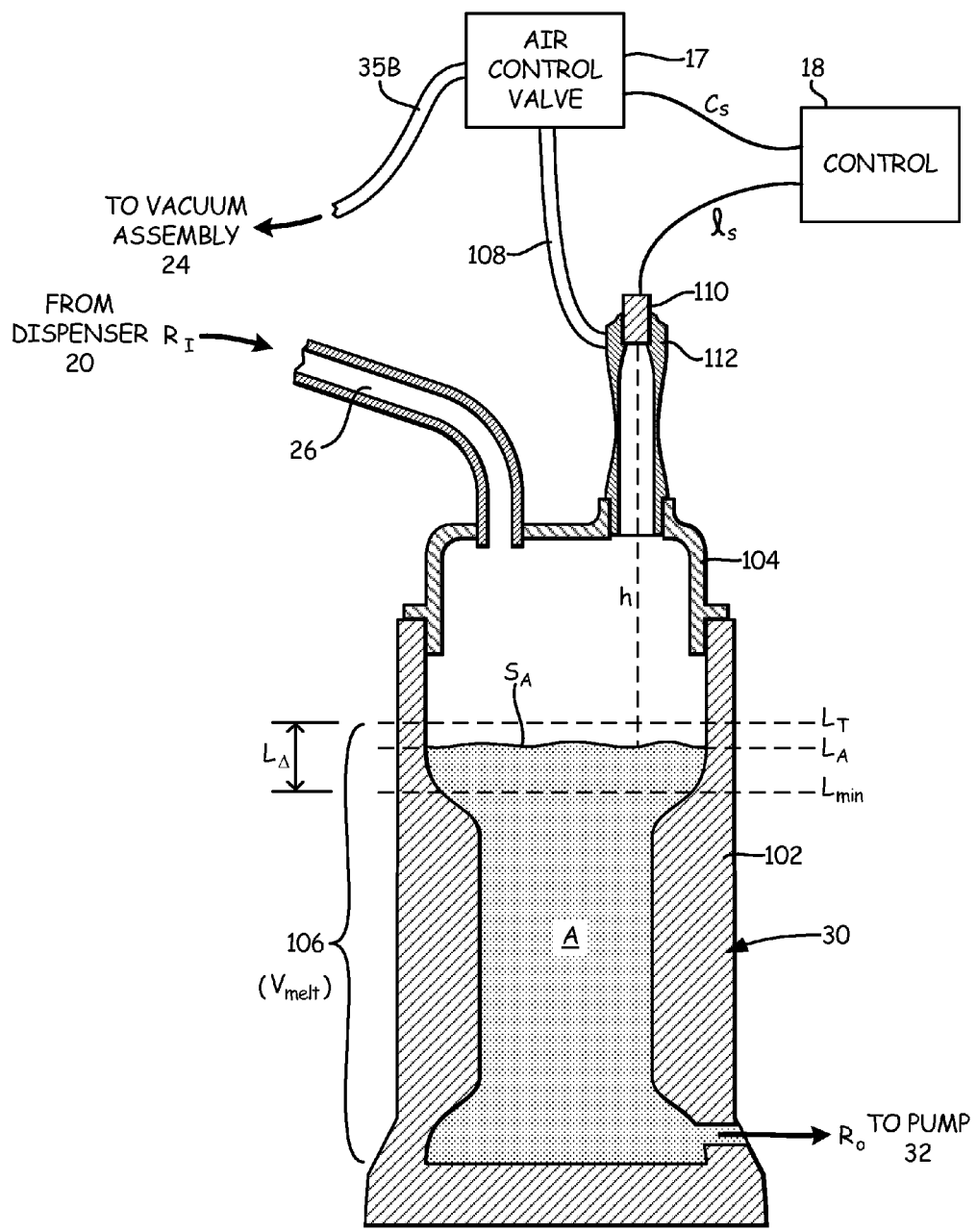
FIG. 2 is a simplified cross-sectional view of a melter with a depth sensor for the system of FIG. 1.

FIG. 2 is a cross-sectional view of melt system 30 and surrounding components. FIG. 2 illustrates air control valve 17, controller 18, feed hose 26, melt system 30, and air hoses 35B and 108. Melt system 30 comprises melter 102 (with melting region 106), cover 104, sensor 110, and sensor housing 112.

Melter 102 is an adhesive receptacle capable of containing and melting solid adhesive received from dispenser 20. Melter 102 has melting region 106, a heated region with melting volume $V_{melt}$ wherein solid adhesive is melted before being pumped by pump 32 to dispenser 34. Melting region 106 may, for instance, be a region of melter 102 provided with a plurality of resistive heating elements. Adhesive pellets from feed hose 26 accumulate within melter 102 to form a body of melting adhesive A. As adhesive A melts, a substantially flat adhesive surface $S_A$ develops at adhesive level $L_A$ within melter 102.

Cover 104 is a rigid cap configured to fit atop melter 102 to protect operators against hot melt splatter, and to anchor feed hose 26 and sensor housing 112. In some embodiments, cover 104 may include one or more vents or air passages (not shown) to let out air from feed hose 26. Sensor housing 112 supports level sensor 110 at a distance from adhesive surface $S_A$ and receives cooling airflow via air hose 108 to protect level sensor 110 from spatter, heat, and dust. Although FIG. 2 depicts air hose 108 as drawing air from air control valve 17, alternative embodiments of system 10 may route air hose 108 directly from air source 16 (see FIG. 1). Level sensor 110 is an ultra-sonic transducer that emits ultrasonic pulses and receives return pulses reflected back from adhesive surface $S_A$. Adhesive level $L_A$ (or height h, a vertical distance between level sensor 110 and adhesive surface $S_A$) can be determined from the time of travel of the pulses from sensor 110 to surface $S_A$ and back to sensor 110. In some embodiments, level sensor 110 may be configured to produce a level signal $l_s$ indicating adhesive level $L_A$. In other embodiments, level sensor 110 may be configured to pass raw sensor data corresponding to height h to controller 18, which then determines adhesive level $L_A$ from this sensor data.

Controller 18 commands air control valve 17 to maintain a flow of adhesive through melter 102 by providing air to vacuum assembly 24 via air hose 35B and to pump 32 via air hose 35C (see FIG. 1). Solid adhesive pellets from feed hose 26 enter melter 102 at input rate $R_I$ determined by the frequency and duration of air pulses sent to vacuum assembly 24 by air control valve 17. Similarly, pump 32 pumps hot melt adhesive out of melter 102 at output rate $R_O$ determined by a pump cycle set by airflow from air control valve 17 to air motor 36. On average, input rate $R_I$ matches output rate $R_O$ during sustained operation, such that the total throughput rate of melt system 30 (e.g. Liters/sec) is $R_{throughput}=R_I=R_O$. Controller 18 controls input and output rates $R_I$ and $R_O$, respectively, by directing control air valve 17 via control signal $c_s$. Control signal $c_s$ is a function of level signal $l_s$, and causes air control valve 17 to direct air to vacuum assembly 24 to maintain adhesive level $L_A$ between minimum level $L_{min}$ and target level $L_T$. Target level $L_T$ is a maximum fill limit selected to avoid overloading melter 102 by depositing unmelted adhesive pellets in a region of melter 102 outside of melting region 106. Minimum level $L_{min}$ is a minimum fill level selected to ensure that melting region 106 remains substantially filled with adhesive throughout ordinary operation, rather than emptying between consecutive adhesive replenishments of unmelted adhesive from feed hose 26. Minimum level $L_{min}$ and target level $L_T$ define the bounds of level range $L_A$, a range of adhesive level $L_A$ allowed during sustained operation.

Controller 18 directs air through vacuum assembly 24 to replenish adhesive A whenever adhesive level $L_A$ falls below minimum level $L_{min}$, ensuring that melter 102 remains substantially full (i.e. within level range $L_A$ of level $L_T$) at all times during sustained operation. In some embodiments, controller 18 may direct a fixed duration pulse of air from air control valve 24 to vacuum assembly 24 via air hose 35B in response to any level signal $l_s$ indicating that adhesive level $L_A$ has below minimum level $L_{min}$. This approach replenishes adhesive A by a fixed amount whenever adhesive level $L_A$ drops below permissible levels. In an alternative embodiment, controller 18 may instead open air control valve 17 to air hose 35B when level signal $l_s$ indicates that adhesive level $L_A$ has fallen below minimum level $L_{min}$, and close air control valve 17 to air hose 35B only when level signal $l_s$ indicates that adhesive level $L_A$ has risen above target level $L_T$. In either case, controller utilizes adhesive level $L_A$ sensed via height h to ensure that melting region 106 remains substantially full of adhesive A during sustained operation of system 10. Vacuum assembly 24, feed hose 26, air control valve 17, controller 18, and level sensor 110 together comprise a feed system that reactively refills melter 102 whenever adhesive level $L_A$ leaves level range $L_\alpha$.

Figure 3:
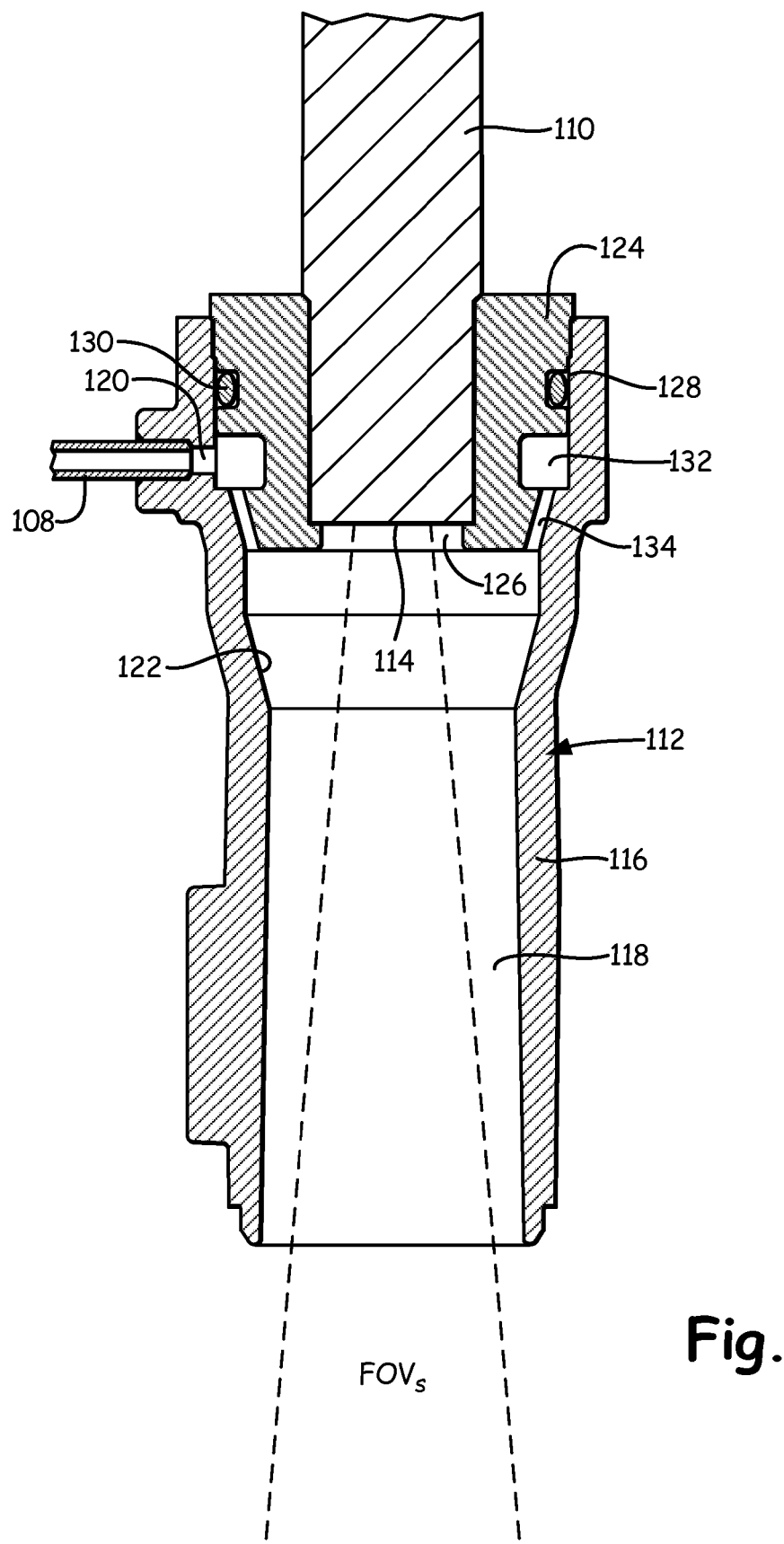
FIG. 3 is a cross-sectional view of a sensor housing for the depth sensor of FIG. 2.

FIG. 3 is a cross-sectional view of level sensor 110 and surrounding components, including air hose 108 and sensor housing 112. Level sensor 110 has sensor face 114 disposed towards adhesive surface $S_A$ (see FIG. 2), with sensor field-of-view $FOV_s$. Sensor housing 112 comprises tower 116 (with interior 118, air inlet 120, and angled wall 122) and insert 124 (with face section 126, slot 128 for O-ring 130, air channel 132, and air ports 134).

As discussed above with respect to FIG. 2, level sensor 110 senses height h, a vertical distance between level sensor 110 and adhesive surface $S_A$, to monitor adhesive level $L_A$. Level sensor 110 has sensor field-of-view $FOV_s$ within which changes in the level of adhesive surface $S_A$ produce changes in level signal $l_s$, which is transmitted to and used by controller 18 as described previously. Level sensor 110 is a contactless sensor, and need not touch adhesive surface $S_A$ to sense changes in adhesive level $L_A$. As a result, level sensor 110 will not produce false level readings due to accumulation of adhesive on sensor 110, unlike existing contact-based sensors. In particular, level sensor 110 may be a sonar level sensor capable of ascertaining height h from ultrasonic pulses transmitted and received at sensor face 114.

Level sensor 110 is supported at a distance from melter 102 and adhesive surface $S_A$ by sensor housing 112, thereby protecting sensor face 114 from dust and debris, spatter, and extreme heat. Tower 116 is a substantially cylindrical support structure that vertically spaces insert 124 away from adhesive A, and defines interior 118. Interior 118 is an air passage open to sensor field-of-view $FOV_s$ that provides a clear path for ultrasonic pulses traveling between sensor face 114 and adhesive surface $S_A$. Air inlet 120 is a port through an upper portion of tower 116 adjacent insert 124 that connects to and receives air from air hose 108. As described above with respect to FIG. 2, air hose 108 may provide air from air control valve 17, or directly from air source 16.

Insert 124 may be made of a thermally conductive material configured to fit into a top portion of tower 116 and securely hold level sensor 110. As depicted in FIG. 3, insert 124 and tower 116 taper from a wide top to a narrow bottom, such that insert 124 naturally rests at the top of tower 116. In alternative embodiments, insert 124 may be secured to tower 116 by other threaded attachment, snap rings, or other means of attachment. Insert 124 includes slot 128, a circular slot or groove in the outer cylindrical surface of insert 124 configured to receive O-ring 130. O-ring 130 forms a seal between insert 124 and tower 116, reducing loss of air from air hose 108 and preventing insert 124 from moving relative to tower 116 once installed. Insert 124 further includes face section 126, a region of sensor housing 112 adjacent sensor face 114. Face section 126 may be an aperture allowing unobstructed airflow along sensor $FOV_s$. Alternatively, face section 126 may be a thin portion of insert 124 through which level sensor 110 can transmit and receive ultrasonic pulses to sense height h.

Sensor housing 112 includes airflow features configured to cool and protect sensor 110. Air channel 132 is a circumferential groove disposed in insert 124 surrounding a portion of level sensor 110 near sensor face 114. Air channel 132 receives cooling airflow from air hose 108 via air inlet 120. As shown in FIG. 3, this cooling airflow circulates within air channel 132 to convectively dissipate heat conducted through insert 124 from level sensor 110. In some embodiments, at least a portion of air channel 132 may directly contact sides of level sensor 110 for direct convective cooling. Air from air channel 132 is expelled into interior 118 via air ports 134, thereby creating a positive pressure region near sensor face 114 that discourages debris and dust from impinging on sensor face 114. As shown in FIG. 3, air ports 134 are airflow paths formed between tower 116 and longitudinal grooves extending downward from air channel 132 at regular angular intervals about the circumference of insert 124. In alternative embodiments, air ports 134 may be formed entirely within insert 124, although the depicted embodiment has the advantage of allowing air channels 132, air ports 134, and face section 126 to be easily cleaned by removing insert 124 from tower 116. Air channel 132 and air ports 134 together form an air passage from inlet 120 to interior 118. Tower 116 has angled wall 122 near air ports 134 to avoid impeding airflow from air ports 134 or causing turbulence that might hinder the sensitivity or reliability of level sensor 110.

During operation of system 10, level sensor 110 detects changes in adhesive level $L_A$ by sensing height h using ultrasonic pulses. Tower 116 of sensor housing 112 distances level sensor 110 from adhesive surface $S_A$, thereby protecting sensor face 114 from spatter, dust, debris, and excessive heat. Air channel 132 further protects level sensor 110 by providing convective airflow to dissipate heat. Air exiting air channel 132 via air ports 134 forms a positive pressure buffer that deflects debris and dust, shielding sensor face 114 from impediments that could reduce sensor accuracy.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:
1. An adhesive melting system comprising:
a melter configured to contain and melt adhesive;
an ultrasonic level sensor positioned to sense a level of adhesive in the melter;
a feed system configured to supply unmelted adhesive to the melter as a function of the sensed level of adhesive in the melter; and
a sensor housing comprising:
a tower extending along a tower axis and spacing the ultrasonic level sensor away from the adhesive;
an insert holding the ultrasonic level sensor atop the tower; and
an air passage disposed between the tower and the insert, the air passage extending between an air channel disposed to receive cooling air through an air inlet in the tower, and a plurality of air ports disposed at acute angles with respect to the tower axis to expel the cooling air into an enclosed interior region of the tower between the ultrasonic level sensor and the melter.

2. The adhesive melting system of claim 1, wherein the air ports are disposed to create a positive pressure region that deflects dust and debris away from the ultrasonic level sensor in the fully inclosed interior region.

3. The adhesive melting system of claim 1, wherein the air ports are disposed circumferentially about the tower axis, and extend axially past a sensor face of the ultrasonic level sensor.

4. The adhesive melting system of claim 1, wherein the tower has an angled wall near the air ports configured to avoid impeding air flow from the air ports or causing turbulence that might hinder sensitivity or reliability of the level sensor.

5. A method for sensing level in an adhesive melter, the method comprising:
melting adhesive pellets within a melter;
sending and receiving ultrasonic pulses from an ultrasonic level sensor to determine location of an adhesive surface within the melter;
replenishing adhesive pellets in the melter as a function of the determined location of the adhesive surface;
flowing air into an air channel of an air passage between a tower and an insert of a sensor housing supporting the level sensor to cool the level sensor and deflect dust and debris away from the level sensor; and
expelling air from the air channel at an acute angle with respect to an axis of the sensor housing, through a plurality of circumferentially distributed air ports, into an interior region of the sensor housing between the ultrasonic level sensor and the melter.

6. The method of claim 5, further comprising deflecting dust and debris away from the ultrasonic sensor via a positive pressure region created between the level sensor and the adhesive surface by expelling the air through the air ports.

7. The method of claim 5, wherein sending and receiving ultrasonic pulses though the sensor housing comprises sending and receiving ultrasonic pulses through the interior.

8. A level sensing system comprising:
a level sensor with a sensor face; and
a sensor housing comprising:
a tower extending along a tower axis from an open end distant from the sensor face to a sensor end proximate to the sensor face, wherein the sensor end holds the level sensor a distance from the open end; and
an air passage for providing airflow to cool and protect the level sensor, the air passage comprising:

an air channel configured to receive and distribute pressurized air flow to convectively cool the level sensor; and a plurality of air ports extending at acute angles with respect to the tower axis, from the air channel to an region interior of the tower.

9. The level sensing system of claim 8, wherein the level sensor is an ultrasonic depth sensor configured to transmit and receive ultrasonic pulses.

10. The level sensing system of claim 8, wherein the air ports are disposed circumferentially about the tower axis to create a positive pressure region between the sensor face and open end of the tower.

11. The level sensing system of claim 10, wherein the air ports are symmetrically disposed about the tower axis.

12. The level sensing system of claim 8, wherein the sensor housing further comprises a face section adjacent the level sensor at the sensor face, and configured to allow ultrasonic pulses to pass through the sensor housing.

13. The level sensing system of claim 12, wherein the face section is a section of thin material through which the level sensor can transmit and receive ultrasonic pulses.

14. The level sensing system of claim 12, wherein the face section is a region of the sensor housing with an aperture through which the level sensor can transmit and receive ultrasonic pulses.

15. The level sensing system of claim 8, further comprising
a melter configured to receive and melt an industrial process material; and
a feed hose configured to draw the industrial process material into the melter when a reading of the ultrasonic level sensor indicates that a level of the industrial process material in the melter has dropped below a target level.

16. The level sensing system of claim 15, wherein the industrial process material is adhesive.

17. The level sensing system of claim 8, wherein the tower has an wall near the air ports that is angled acutely with respect to the tower axis so as not to impede air flow or cause turbulence near the sensor face.

* * * * *